United States Patent [19]
Arcouette

[11] 3,819,239
[45] June 25, 1974

[54] ENDLESS TRACK
[75] Inventor: Leonard Arcouette, Granby, Quebec, Canada
[73] Assignee: Twinpak Ltd., Quebec, Canada
[22] Filed: Sept. 8, 1972
[21] Appl. No.: 287,432

Related U.S. Application Data
[63] Continuation-in-part of Ser. No. 87,991, Nov. 9, 1970, abandoned.

[30] Foreign Application Priority Data
Nov. 4, 1970 Canada..............................97429

[52] U.S. Cl............................................. 305/35 R
[51] Int. Cl............................................. B62d 55/22
[58] Field of Search....................... 305/38, 35 R, 47; 74/245 P, 250 C

[56] References Cited
UNITED STATES PATENTS
2,370,667  3/1945  Johnson ............................ 305/35 R
2,911,091  11/1959  Imse ................................... 74/245 P
3,285,676  11/1966  Hetteen .............................. 305/38
3,602,364  8/1971  Maglio .......................... 305/35 R X
3,726,569  4/1973  Maglio ................................. 305/38

Primary Examiner—Richard J. Johnson
Attorney, Agent, or Firm—Alan Swabey; Robert E. Mitchell

[57] ABSTRACT

The track for a snowmobile endless track made up of relatively rigid links having a pair of spaced-apart rows of driving sprocket engagement apertures.

3 Claims, 6 Drawing Figures

PATENTED JUN 25 1974 3,819,239

3,819,239

ENDLESS TRACK

CROSS REFERENCE TO RELATED APPLICATION

This application is a continuation-in-part of application Ser. No. 087,991, filed Nov. 9, 1970, now abandoned.

BACKGROUND OF THE INVENTION

1. Field of Invention

The present invention relates to an endless track for a track laying vehicle, and particularly for a light smowmobile vehicle of the type using a single endless track.

2. Description of Prior Art

An impressive industry has developed in the past decade directed to the manufacture of light-weight snow vehicles of the type used for the transportation of one or two persons, which comprises an open chassis driven by a single endless track steered by a pair of short skis forward of the endless track. This type of snow vehicle was made practical when a suitable endless track was developed by Bombardier as described in his U.S. Pat. No. 2,899,242, issued Aug. 11, 1959. Since then, numerous other similar tracks have been developed as described in U.S. Pat. Nos. 3,285,677, Marier, 1966; 3,416,845, Scanland, 1968; 3,451,729, Roy, 1969; and Canadian Pat. No. 768,529, Boulanger, 1967. However, all of these patents relate to the longitudinally flexible elastomeric belt which is relatively laterally inflexible. The bottom run of the endless track is, of course, that part which is supported on the surface of the terrain or snow. Being longitudinally flexible, the elastomeric belt normally follows the contours of the surface of the terrain. Since the suspension system and driving wheels must pass over the bottom run of the endless track, it is caused to climb over the various obstacles met by the longitudinal flexible elastomeric belt.

Furthermore, since in most belt developments, as described in the above patents, the lateral inflexible feature of the belt is provided by spring steel strips or rods and since the suspension system of the snow vehicle normally engages the lower run of the track near the outer edges of the track, the median portion of the track is caused to bow. Both the laterally bowing of the belt and the longitudinal contour following of the belt reduce the efficiency and speed of the vehicle as it passes over the track laying belt. Theoretically, the purpose of laying track over a rough terrain is to provide a flat pressure-bearing surface to allow the conventional drive wheels to pass thereover. It is obvious from the above that the endless belts used today on the popular snow vehicles do not fully meet this purpose.

Furthermore, since the endless tracks in the prior art are molded as a continuous strip of elastomeric material, the strip must be continually bent about the sprocket wheel as it moves from one flat run to the other. It is known in the industry that the force necessary to bend the endless track about the sprockets of either end uses up energy in the form of horsepower from the engine.

SUMMARY OF INVENTION

It is an aim of the present invention to provide an endless track for a snow vehicle and the like which will increase the efficiency and performance of a snow vehicle by providing a flatter and more rigid bottom track laying run both laterally and longitudinally.

It is a further aim of the present invention to provide an endless track which will easily flex about the sprocket wheel at each end thereof. In a preferred embodiment, the apertures in the individual links are located at a distance equal to the pitch of the teeth on the sprocket wheels and therefore, each individual link making up the belt is equivalent in longitudinal length of the belt to the pitch of the particular teeth in the sprocket wheels. Since the sectionalized hinged link type of belt of the type described does not need to be bent around the sprocket wheels, the sections are merely hinged. The efficiency of the engine may be increased since considerably less horsepower is used up in forcing the endless belt around the sprocket wheels.

In order to enhance the flatness of the lower run of the endless track, abutment means are provided between the hinged links to prevent the links from hinging inwardly allowing the links to pivot outwardly when the links are passing over the sprocket wheels.

It is a further aim of the present invention to reduce the wear and tear of the endless track.

BRIEF DESCRIPTION OF THE DRAWINGS

Having thus generally described the nature of the invention, particular reference will be made to the accompanying drawings, illustrating a preferred embodiment thereof, and in which.

Figure 1:
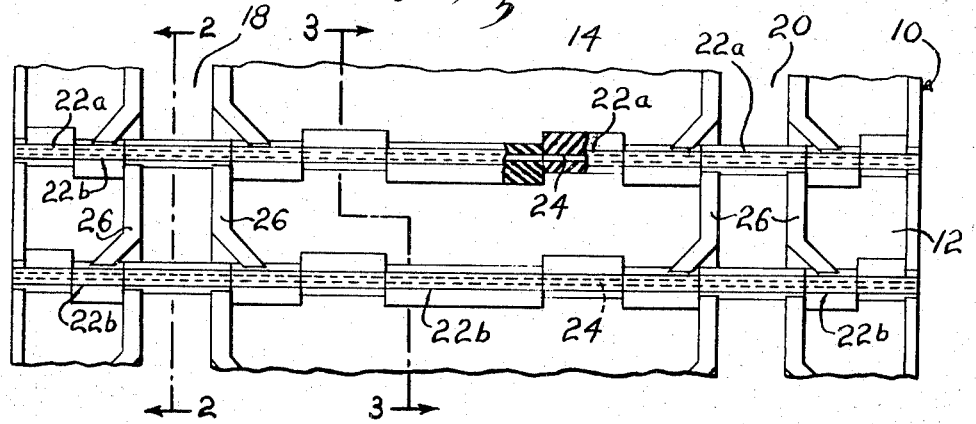
FIG. 1 is a fragmentary bottom plan view of a series of hinged links making up the endless track.
Figure 2:
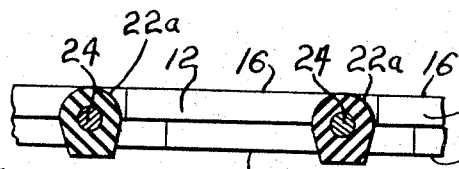
FIG. 2 is a vertical cross section taken along lines 2—2 of FIG. 1.
Figure 3:
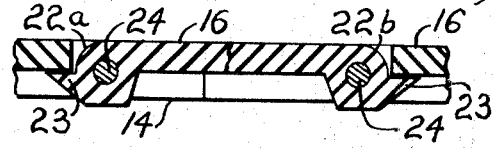
FIG. 3 is a vertical cross section taken along lines 3—3 of FIG. 1.
Figure 4:
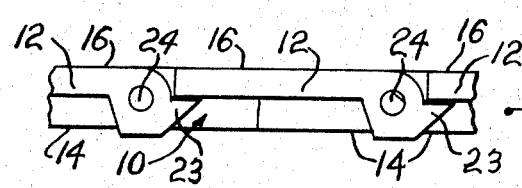
FIG. 4 is an end elevation of the fragmentary endless track shown in FIG. 1.
Figure 6:
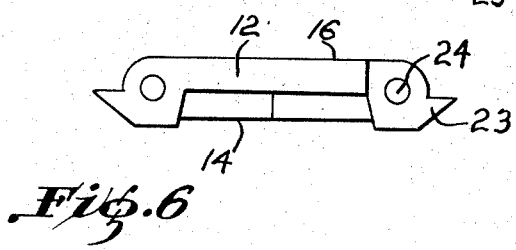
FIG. 6 is an end view of an individual link.
Figure 5:
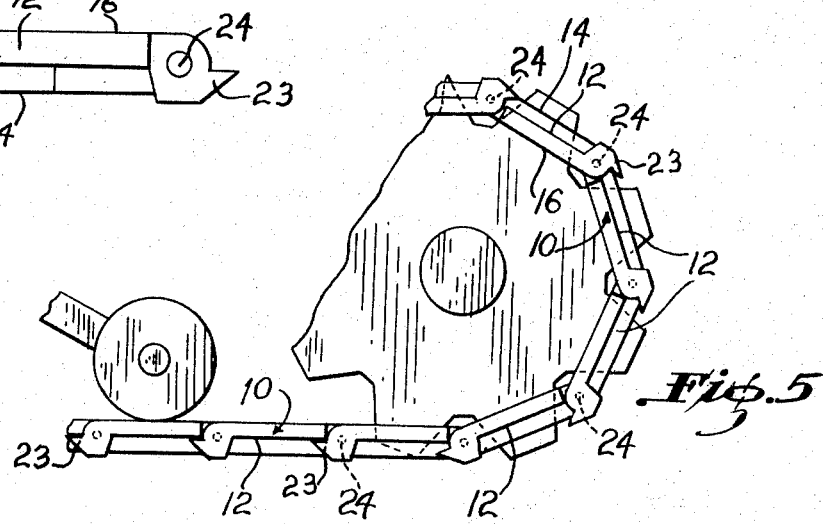
FIG. 5 is a fragmentary side elevation showing the endless track passing over a sprocket wheel.

An endless track as shown generally at 10 includes a plurality of links 12. The endless belt 10 has a gripping surface 14 and an inner surface 16. A pair of rows of openings 18 and 20 are provided near, but spaced from, each edge of the endless belt 10. Preferably, the rows are made up by the provision of a pair of openings 18 and 20 in each link 12.

The individual links 12 must be of a short extent in the longitudinal direction of the endless track, since the endless belt must pass over the sprocket wheels and the idler wheels at about a three or four inch radius. If, of course, the diameter of the driving wheels about which the endless track must pass is greater, the extent of the individual links 12 along the longitudinal axis of the belt could be greater.

In the present embodiment, the extent of the link 12 in the longitudinal axis of the track was 2 inches, while its lateral extent was 15 inches. Of course, the lateral extent of the belt can vary depending on the characteristics of the snow vehicle which is being used.

Each link is provided with alternating spaced-apart sleeves 22a along the leading edge and 22b along its trailing edge. The sleeves 22a and 22b of adjacent links are mated together so that the longitudinal openings in the sleeves coincides in an elongated hinge pin 24, and is inserted through the sleeve. Each sleeve 22a and 22b includes an abutting shoulder 23 adapted to engage the lower surface 25 of the link 12. As the links pass along the bottom run of the track, they are prevented from hinging about the rod 24 in an upward direction inward of the track as shown. However, the links are allowed to flex or hinge in the other direction since the abutment no longer prevents this hinging movement. Accordingly, the flatter platform is provided in the lower run to allow the bogie wheels to run over the flat surface of the track but no impediment is provided to allow the links from hinging about the sprocket wheel as shown.

On the gripping surface 14 as shown in FIG. 1, each link can include a number of projections which will increase the traction of the track on the terrain. For instance, in the present embodiment, reinforcing ribs 26 are provided about the opening and, of course, project from the plane of the gripping surface 14. On the inner surface of the belt, it is necessary to eliminate all projections and to keep the surfaces 16 of the links 12 flat, since these surfaces are to bear the various suspension-bearing systems such as wheels and the like.

The material used in the present embodiment is used in the manufacture of the individual links and is an ethyl vinyl acetate which is a relatively rigid plastic but is flexible over the lateral extent of the individual links.

I claim:

1. An endless track for a vehicle made of relatively rigid plastic material comprising a plurality of link members, each link member including a plurality of spaced-apart mating sleeves on the lateral edges thereof, a reinforcing hinge rod adapted to pass through the aligned mating sleeves of adjacent links, to permit the individual links to hinge about said rod and to laterally reinforce the endless track, the track having an inner flat smooth surface on which the undercarriage bears, and an outer gripping surface; pairs of longitudinally aligned spaced-apart apertures in the endless track adapted to receive the teeth of a cooperating drive sprocket in the undercarriage, with a pair of apertures provided in each link, the longitudinal width of each link being equal to the pitch of the teeth of the sprocket; and means for preventing flexing of the link members inwardly of the belt but permitting the links to flex outwardly, including abutment shoulders on the sleeves adapted to engage the outer surface of the adjacent link.

2. An endless belt as defined in claim 1 wherein each link has an inside surface in relation to the endless belt and a gripping surface, a leading edge and a trailing edge, each aperture in each link being reinforced on the gripping surface side of the link and at least a reinforced hinged sleeve provided on the leading edge of the link adjacent each aperture.

3. An endless belt as defined in claim 1 wherein each hinged link includes an inner surface and an outer gripping surface in relation to the endless belt, each link has a plurality of gripping projections on the gripping surface.

* * * * *